(12) United States Patent
Huffer et al.

(10) Patent No.: US 10,022,623 B2
(45) Date of Patent: Jul. 17, 2018

(54) ERGONOMICALLY CORRECT GAME CONTROLLER

(76) Inventors: Dustin Huffer, Anaheim, CA (US); Shawn Huffer, Henderson, NV (US)

(*) Notice: Subject to any disclaimer, the term of this patent is extended or adjusted under 35 U.S.C. 154(b) by 0 days.

(21) Appl. No.: 13/312,847

(22) Filed: Dec. 6, 2011

(65) Prior Publication Data

US 2012/0142420 A1  Jun. 7, 2012

Related U.S. Application Data

(60) Provisional application No. 61/420,245, filed on Dec. 6, 2010.

(51) Int. Cl.
*A63F 13/00* (2014.01)
*A63F 13/24* (2014.01)
*A63F 13/235* (2014.01)

(52) U.S. Cl.
CPC ............ *A63F 13/24* (2014.09); *A63F 13/235* (2014.09); *A63F 2300/1018* (2013.01); *A63F 2300/1031* (2013.01); *A63F 2300/1043* (2013.01)

(58) Field of Classification Search
CPC .... A63F 13/06; A63F 2300/1043; G06F 3/02; G06F 3/0219
USPC .................................. 463/9, 37, 38
See application file for complete search history.

(56) References Cited

U.S. PATENT DOCUMENTS

| | | | |
|---|---|---|---|
| 2001/0003713 A1* | 6/2001 | Willner et al. | 463/37 |
| 2004/0224765 A1* | 11/2004 | Martinez et al. | 463/37 |
| 2005/0239524 A1* | 10/2005 | Longman et al. | 463/9 |
| 2006/0007159 A1* | 1/2006 | Lane et al. | 345/168 |
| 2007/0066394 A1* | 3/2007 | Ikeda et al. | 463/37 |
| 2007/0256913 A1* | 11/2007 | Wee et al. | 200/5 A |
| 2008/0303698 A1* | 12/2008 | Casparian et al. | 341/22 |
| 2010/0045490 A1* | 2/2010 | Odell et al. | 341/22 |

* cited by examiner

*Primary Examiner* — James S McClellan
*Assistant Examiner* — Kevin Carter
(74) *Attorney, Agent, or Firm* — Franklin M. Smith; Dickinson Wright PLLC

(57) ABSTRACT

A hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

15 Claims, 15 Drawing Sheets

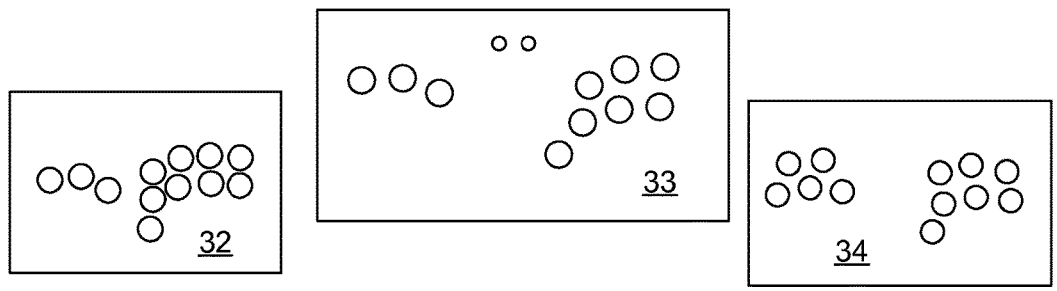
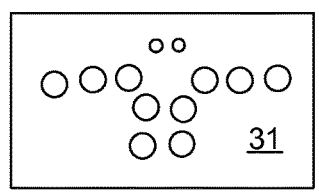
FIG. 7
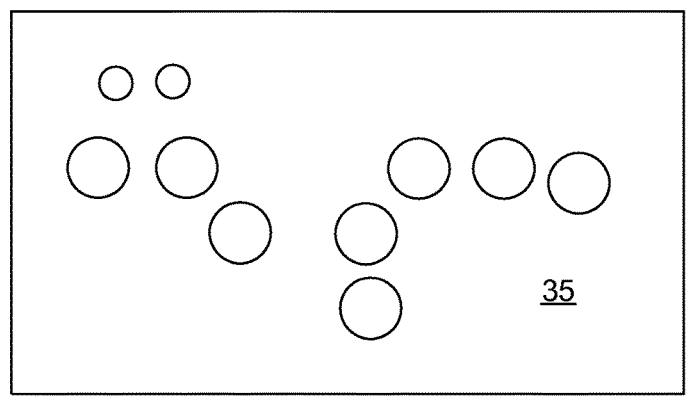
FIG. 8

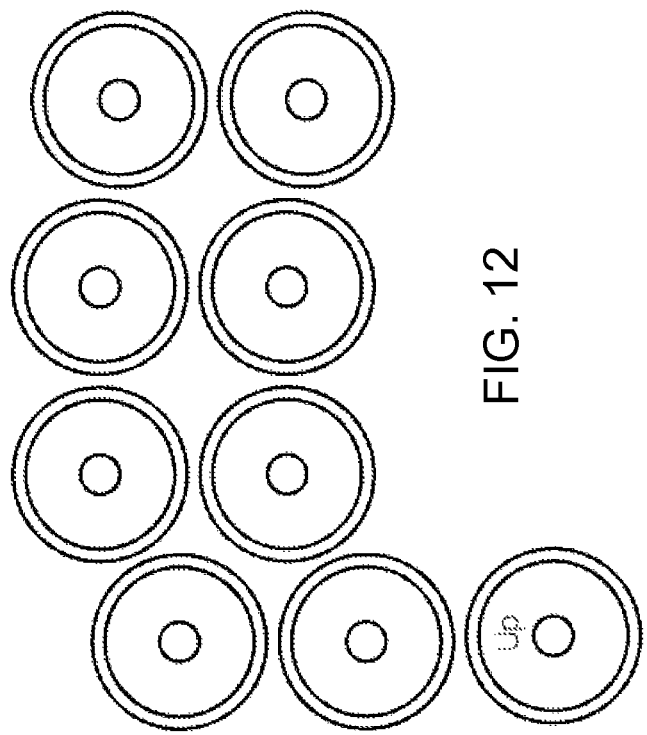
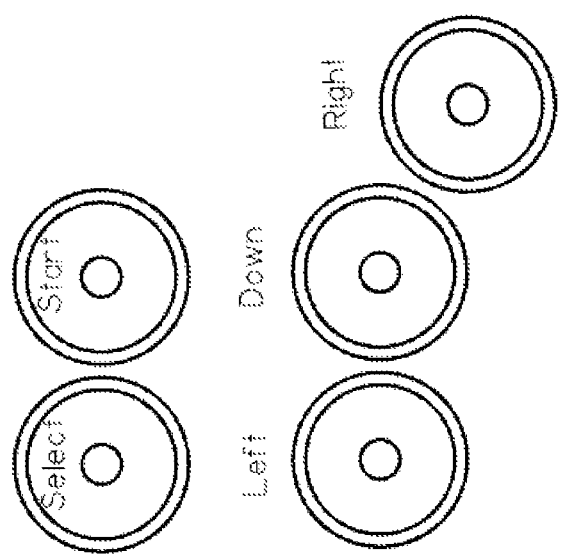
FIG. 12

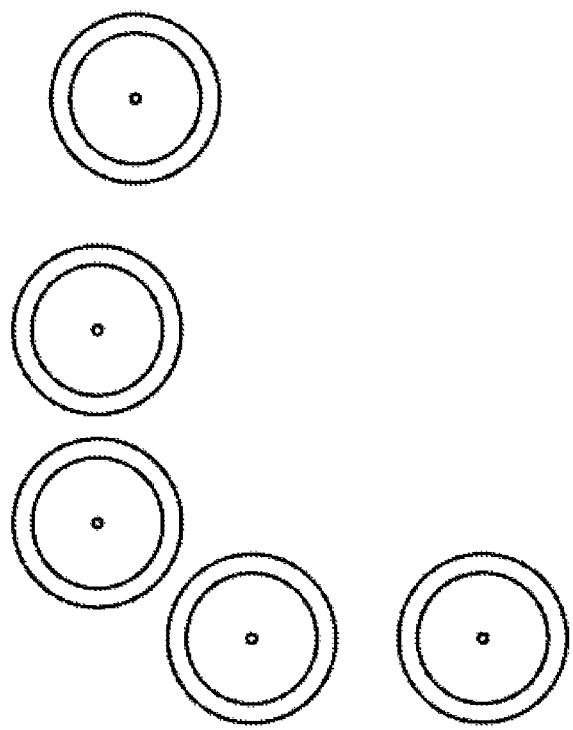
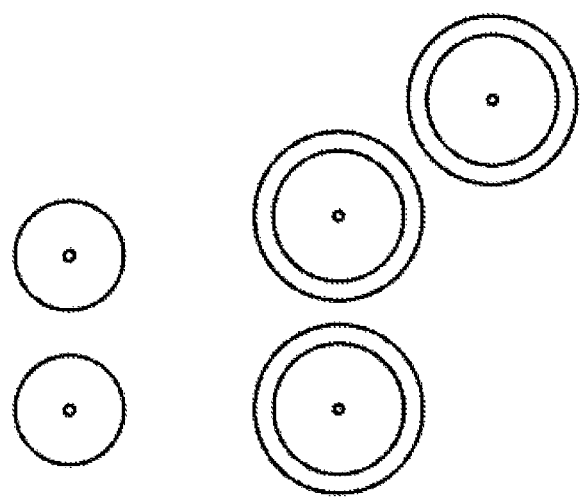
FIG. 13

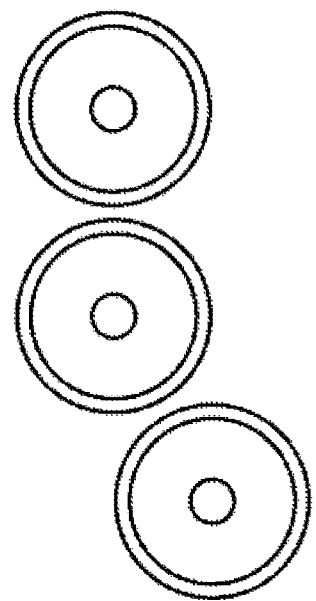
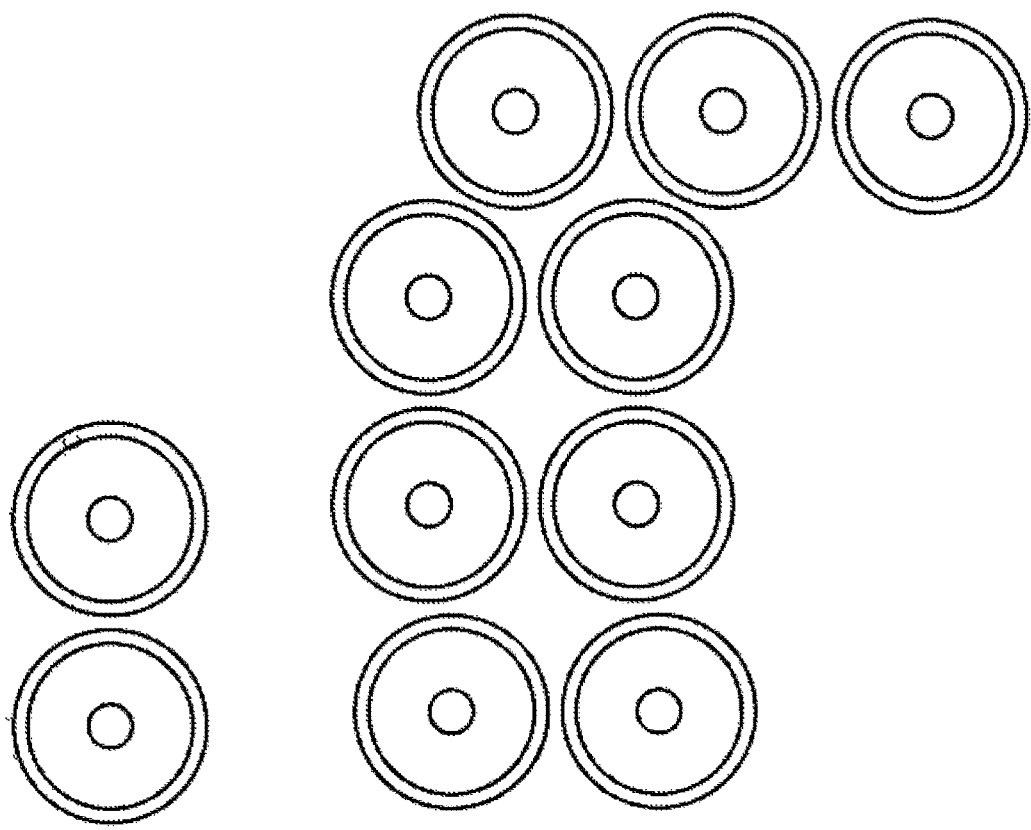
FIG. 15

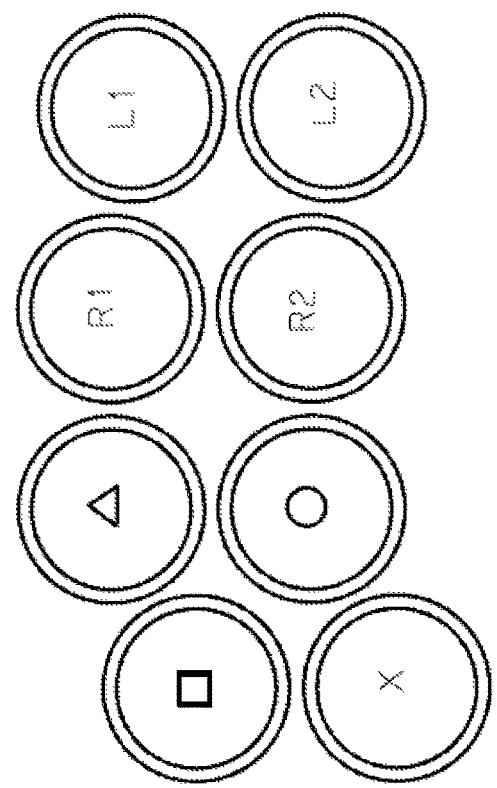
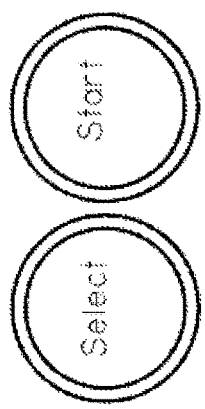
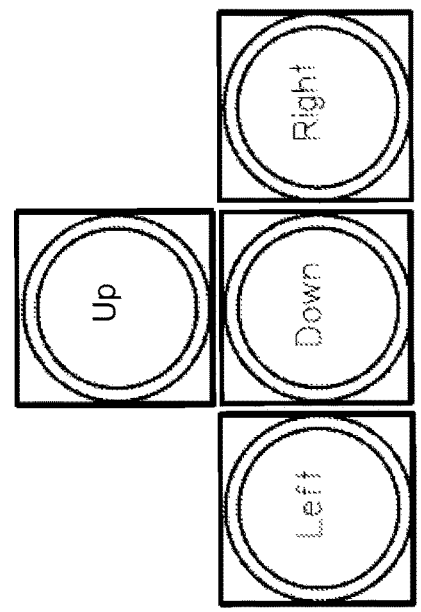
FIG. 19

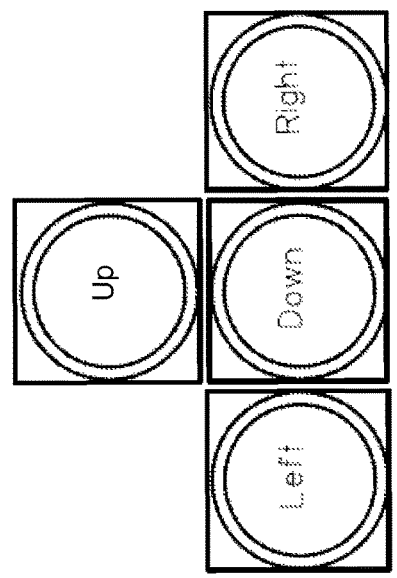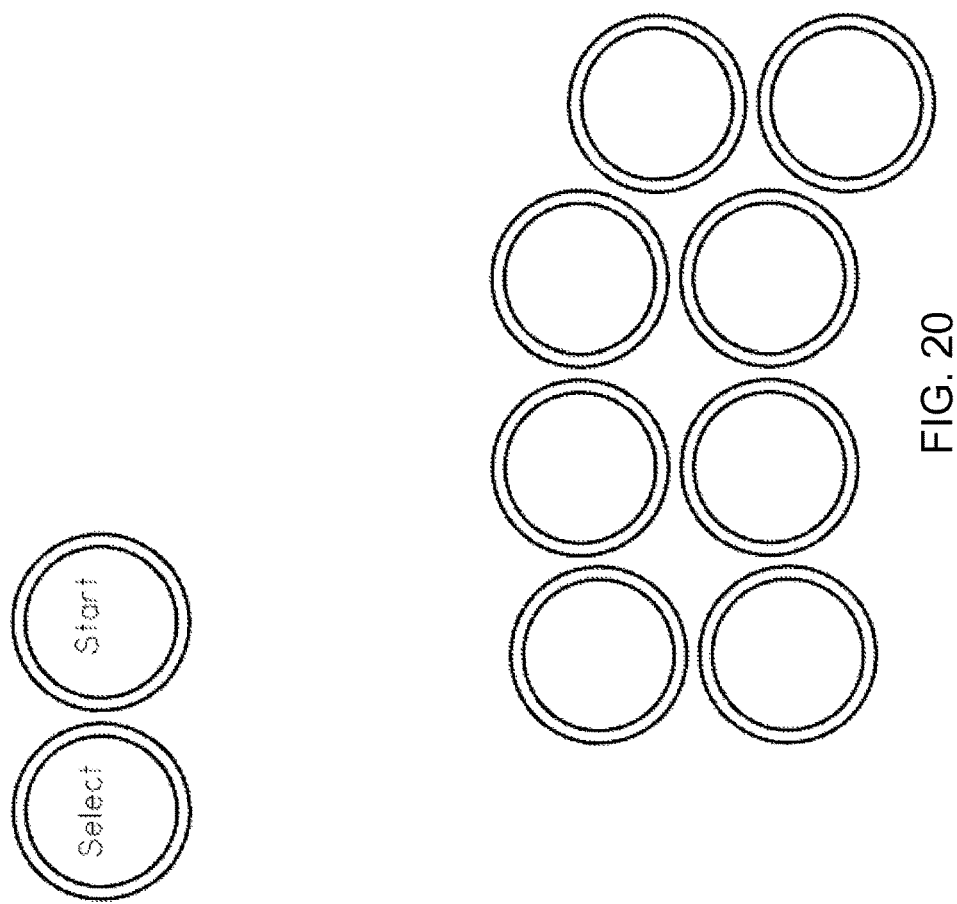
FIG. 20

ERGONOMICALLY CORRECT GAME CONTROLLER

The present invention relates to electronic game consoles and, in particular, to controllers for electronic game consoles. This application claims the benefit of Provisional Application 61/420,245 filed Dec. 6, 2010, which is incorporated by reference herein.

BACKGROUND OF THE INVENTION

Home video game systems are an extremely popular activity around the world. In a typical arrangement, a user operates a controller having a joystick and buttons and that is connected to a game console to control action on a monitor screen, such as the screen of a television set. While each gaming platform has its own specific design, all tend to utilize a joystick/push button arrangement. Unfortunately, the prior art placement of the buttons and utilization of the joystick is not conducive to the most efficient play. The human hand is shaped in a very specific manner with fingers positioned also in a specific manner. Prior art controllers are not designed to take advantage of the natural features of a human hand.

FIG. 1 shows a prior art Sony Playstation® Controller. Playstation® is a registered trademark of the Sony Computer Entertainment, Inc. The control buttons are labeled in the figure as shown. Buttons 40 control the left, right, up and down movement of a character across the screen. Buttons 50 control certain actions of the character. For example the triangle might control a high punch, the circle might control a low punch, a triangle might control a high kick, and an "X" might control a low kick. Buttons 60 (L1 and L2) can be configured to control various combat actions. Buttons 70 (R1 and R2) are similarly configured to control other combat actions.

What is needed is a better game controller.

SUMMARY OF THE INVENTION

The present invention provides a hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

BRIEF DESCRIPTION OF THE DRAWINGS

FIGS. 5-9 show multiple preferred embodiments of the present invention.
FIGS. 12-20 show multiple preferred embodiments of the present invention.

DETAILED DESCRIPTION OF THE PREFERRED EMBODIMENTS

The present invention is an alternative to traditional gaming controllers to provide greater speed and accuracy in the fighting game genre. The present invention recognizes that eliminating the joystick method and utilizing an all-push-button design operated by the fingertips yields greater game efficiency in an ergonomic fashion. Hence, a significant distinction of the present invention from "arcade joysticks" is the removal of the joystick entirely and replacing it with four arcade-quality directional pushbuttons. In doing so travel time and accidental inputs are near-eliminated. Game users enjoy superior control and ease of complex movements.

Figure 1:
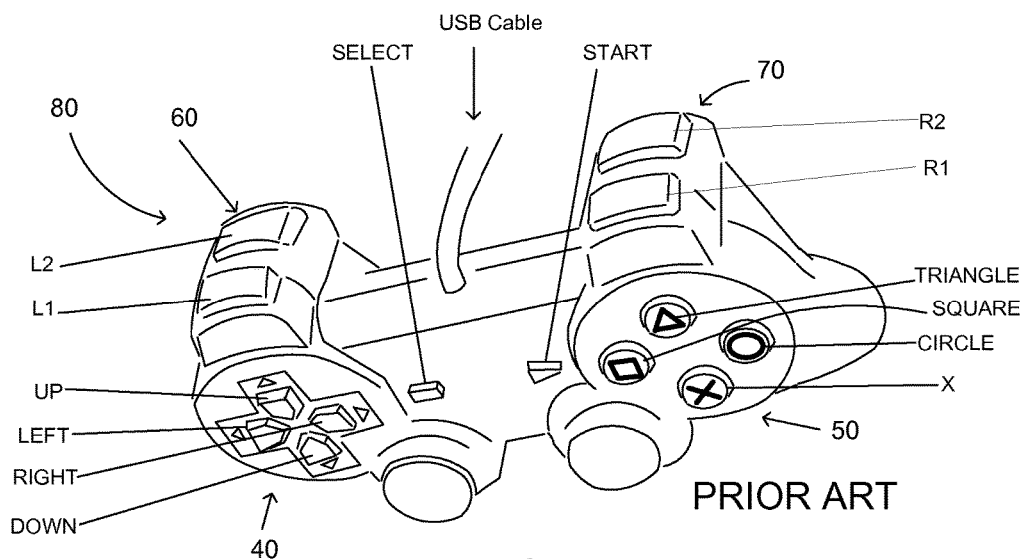
FIG. 1 shows a prior art game controller.
Figure 2:
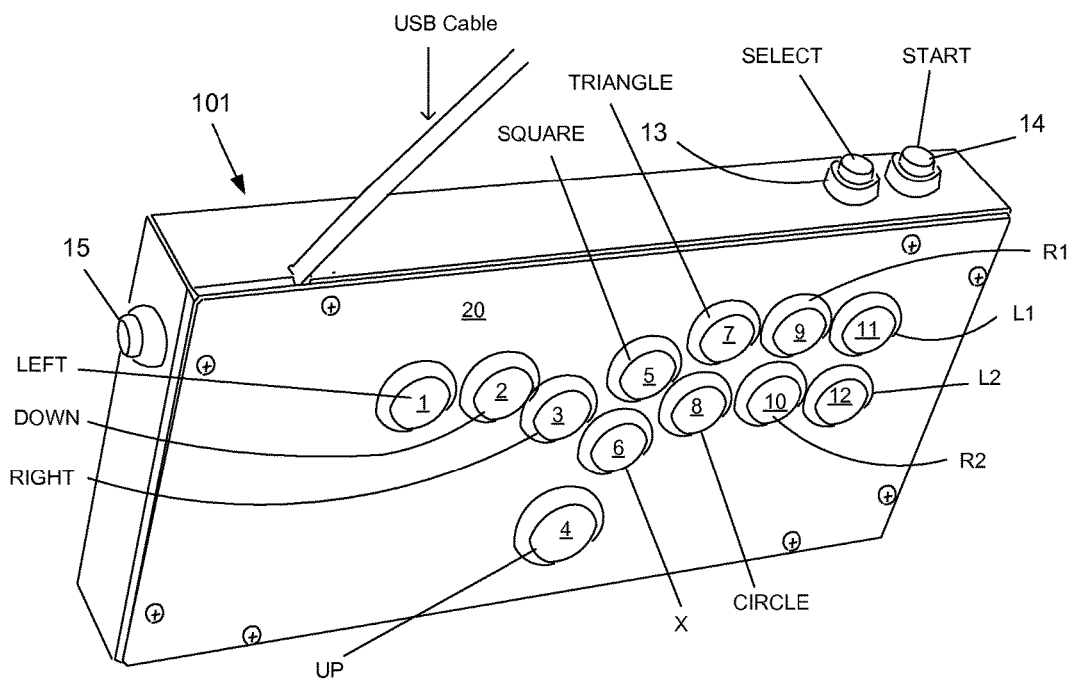
FIG. 2 shows a preferred embodiment of the present invention.

FIG. 1 shows a prior art Sony Playstation® Controller 80. The control buttons are labeled in the figure as shown. The button placement, however, is arbitrary and does not logically conform to the natural contours of a human hand. FIG. 2 preferred box shaped controller 101. The buttons have been placed on backing 20 as shown. In the embodiment shown, buttons 1-4 correspond to movement buttons 40 (FIG. 1) and buttons 5-14 correspond to function buttons 50, 60 and 70 (FIG. 1) Button placement has been carefully considered so that it matches the natural contour and shape of the human hand. In this manner, a user can more precisely control the game action. This is very important for competitive gamers who are striving to achieve the highest possible score. It is much more natural to play a computer game if the button placement matches the position of the user's fingers.

Figure 3:
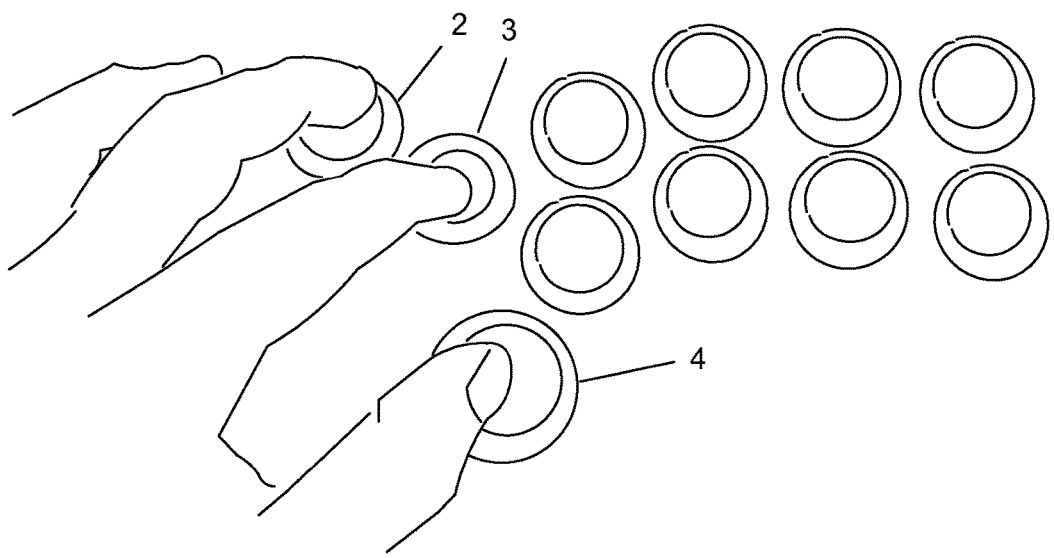
FIGS. 3 and 4 show a user operating a preferred embodiment of the present invention.
Figure 4:
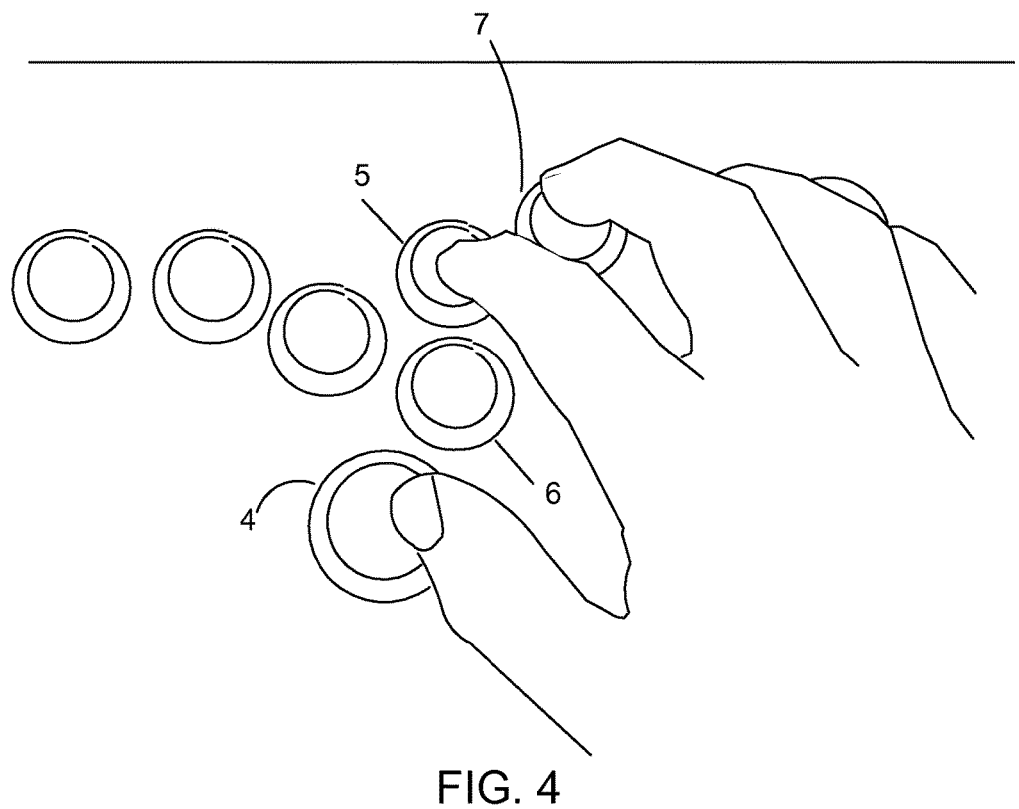

FIGS. 3 and 4 give a very good illustration of the user's hands and fingers appropriately positioned over the buttons of the embodiment shown in FIG. 2. Specifically, in FIG. 3, the left hand is positioned to control the left, right, up and down motion of a character in the game. In FIG. 4, the right hand is appropriately positioned to control fighting movements and other special motions and actions. It should be noted that the right or left thumb can equally reach "up" button 4.

Figure 5:
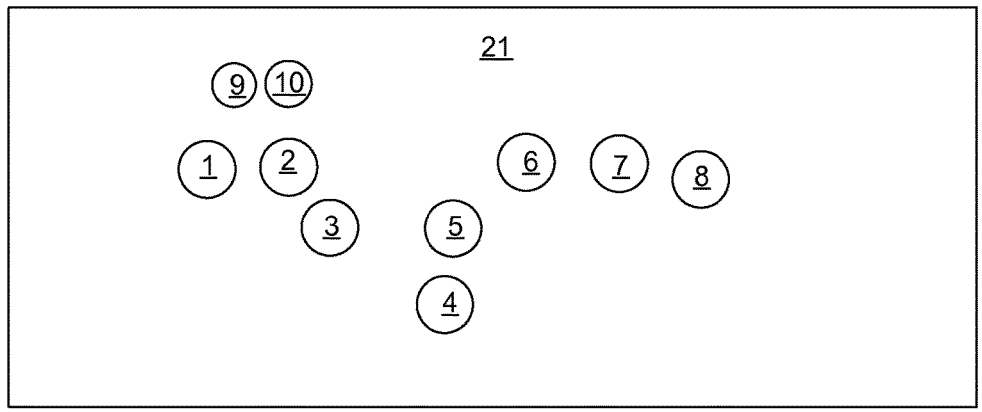
Figure 6:
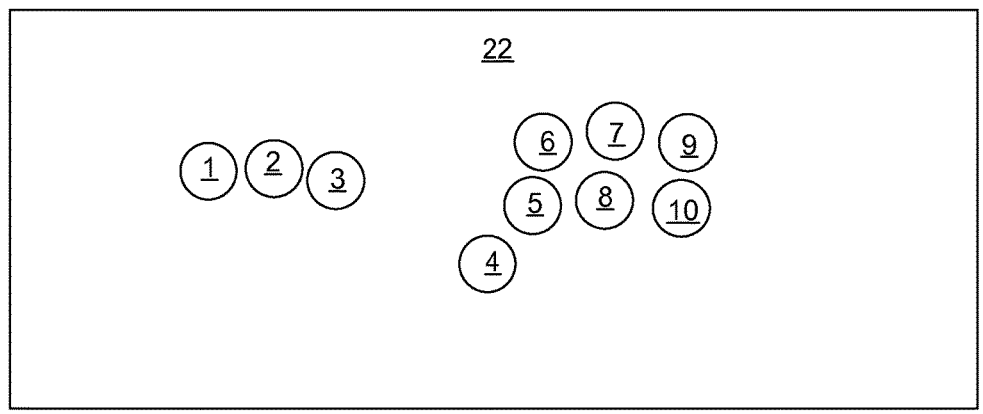

It should be understood that the specific placement of buttons can be modified as desired. The important consideration is that the buttons are placed so that the fingers of the hand can naturally reach the buttons with minimum effort, as shown in the figures. FIGS. 2-4 show one preferred positioning of buttons 1-15. It should be noted that the exact positioning, size and amount of buttons can be modified. It is preferable, however, that the position of the buttons are such that they conform to the natural contour and shape of the user's hand. For example, FIG. 5 shows controller 21 with buttons placed as shown. FIG. 6 shows controller 22 with buttons placed in an alternative style. FIG. 7 shows controllers 31-34 with buttons positioned as shown. FIG. 8 shows preferred controller 35 with buttons positioned as shown.

Figure 9:
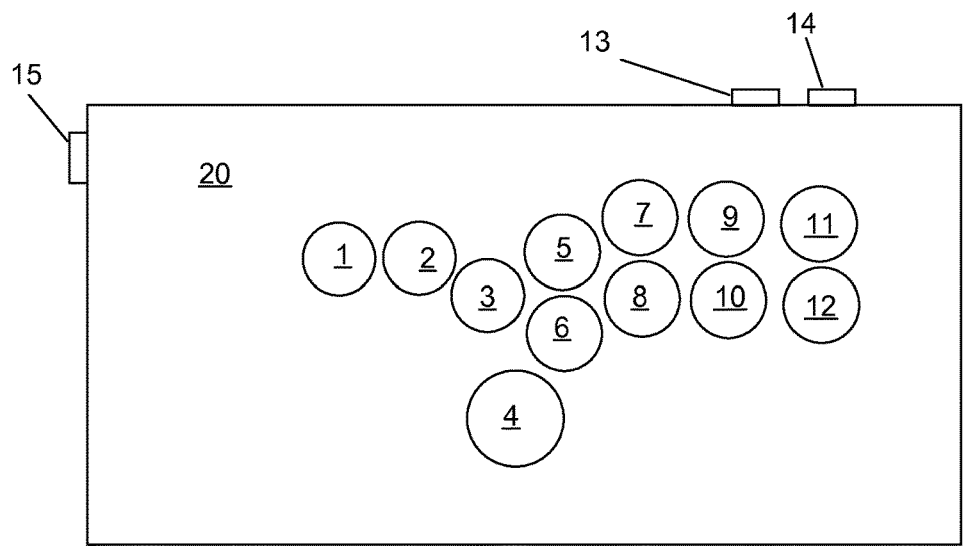
Figure 10:
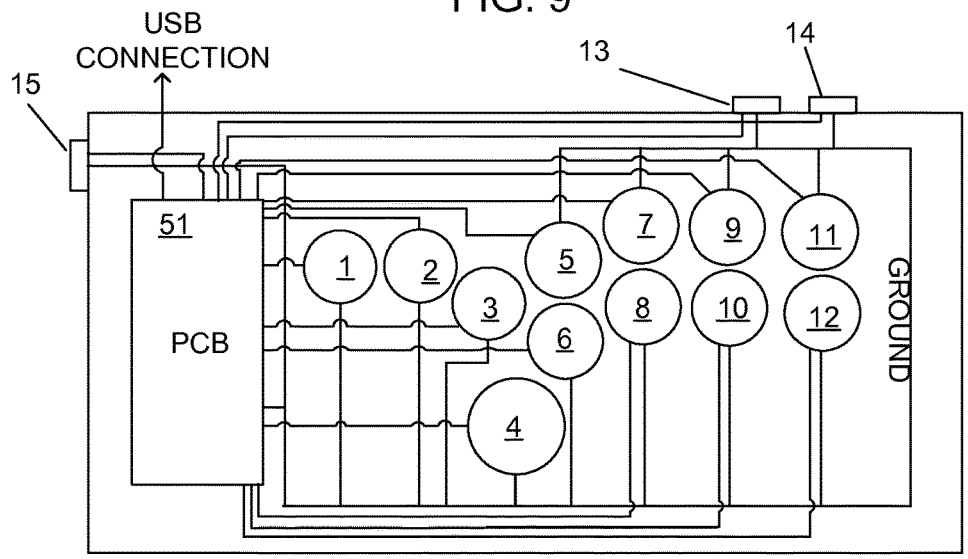
FIGS. 10-11 show preferred electrical connectivity.
Figure 11:
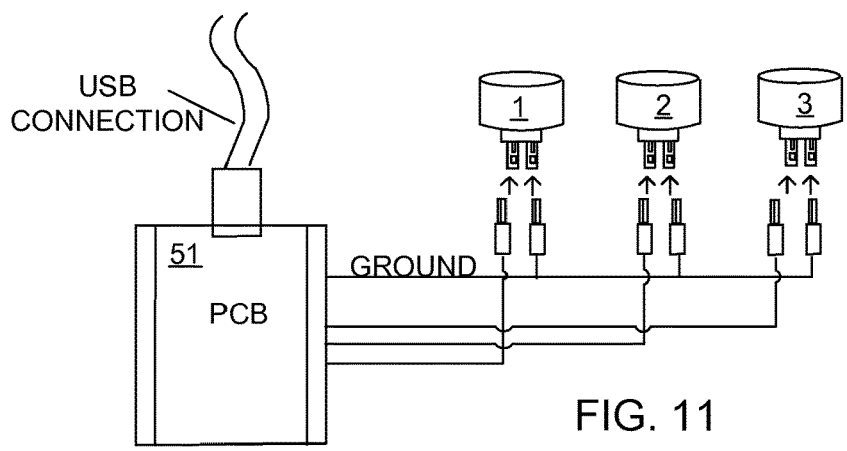
Figure 14:
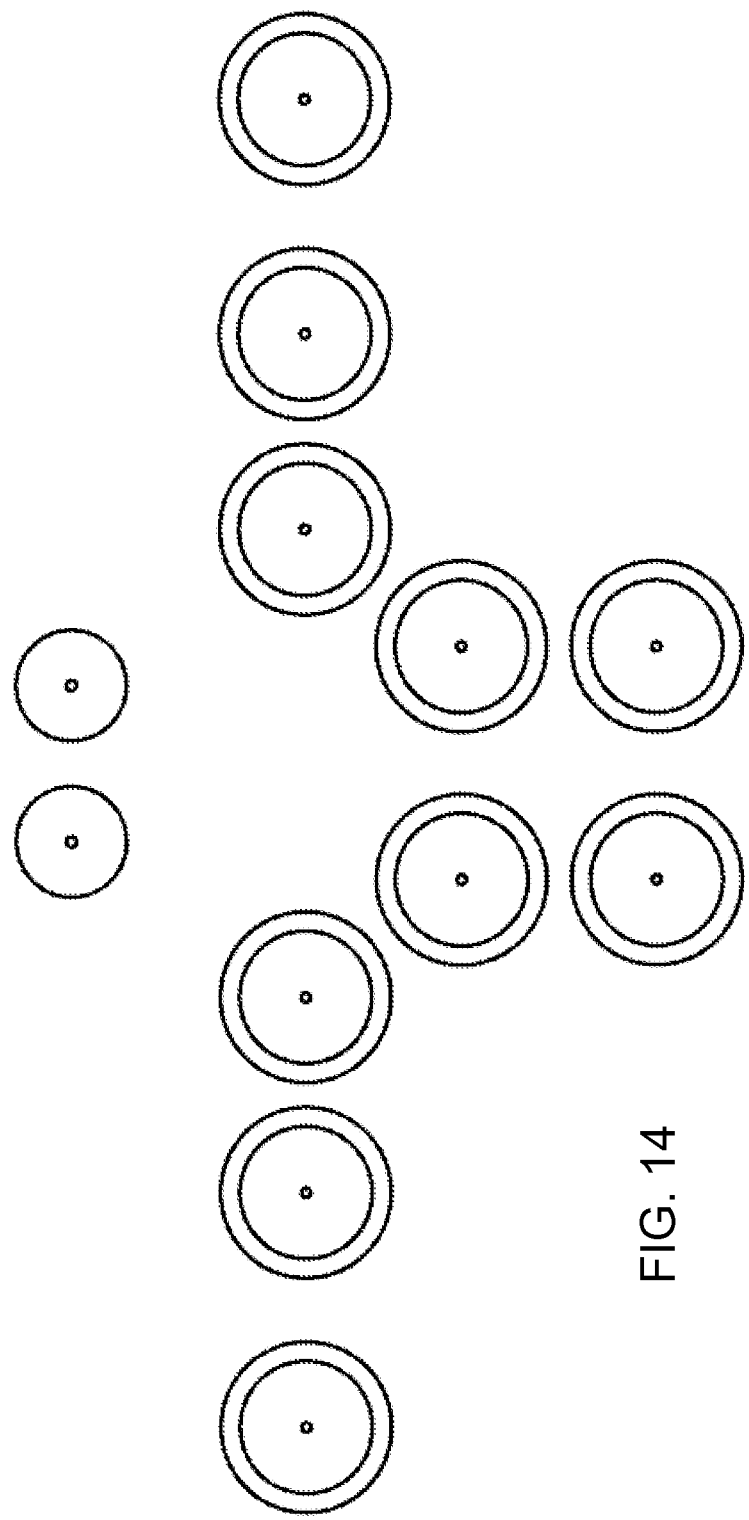
Figure 16:
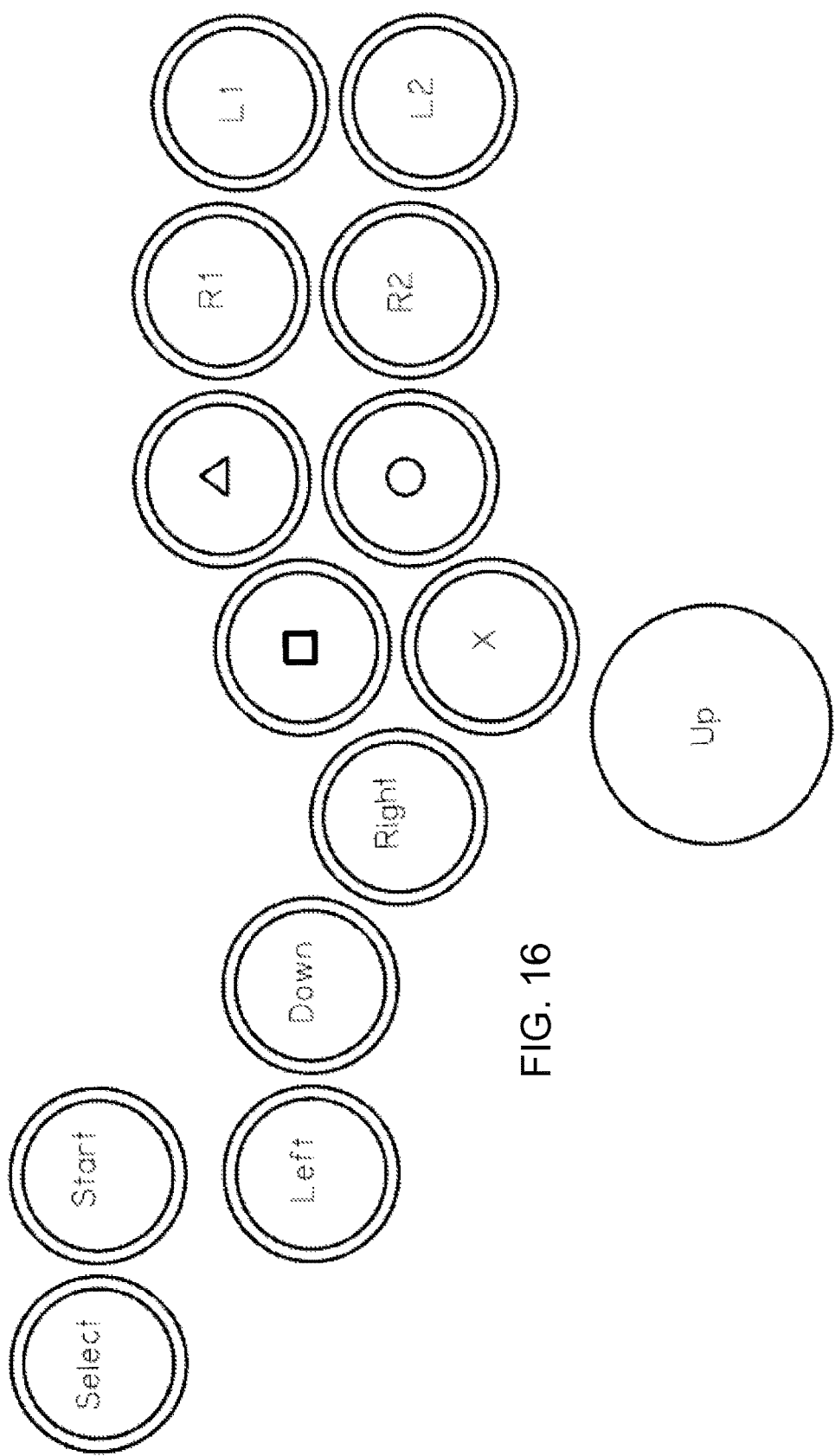
Figure 17:
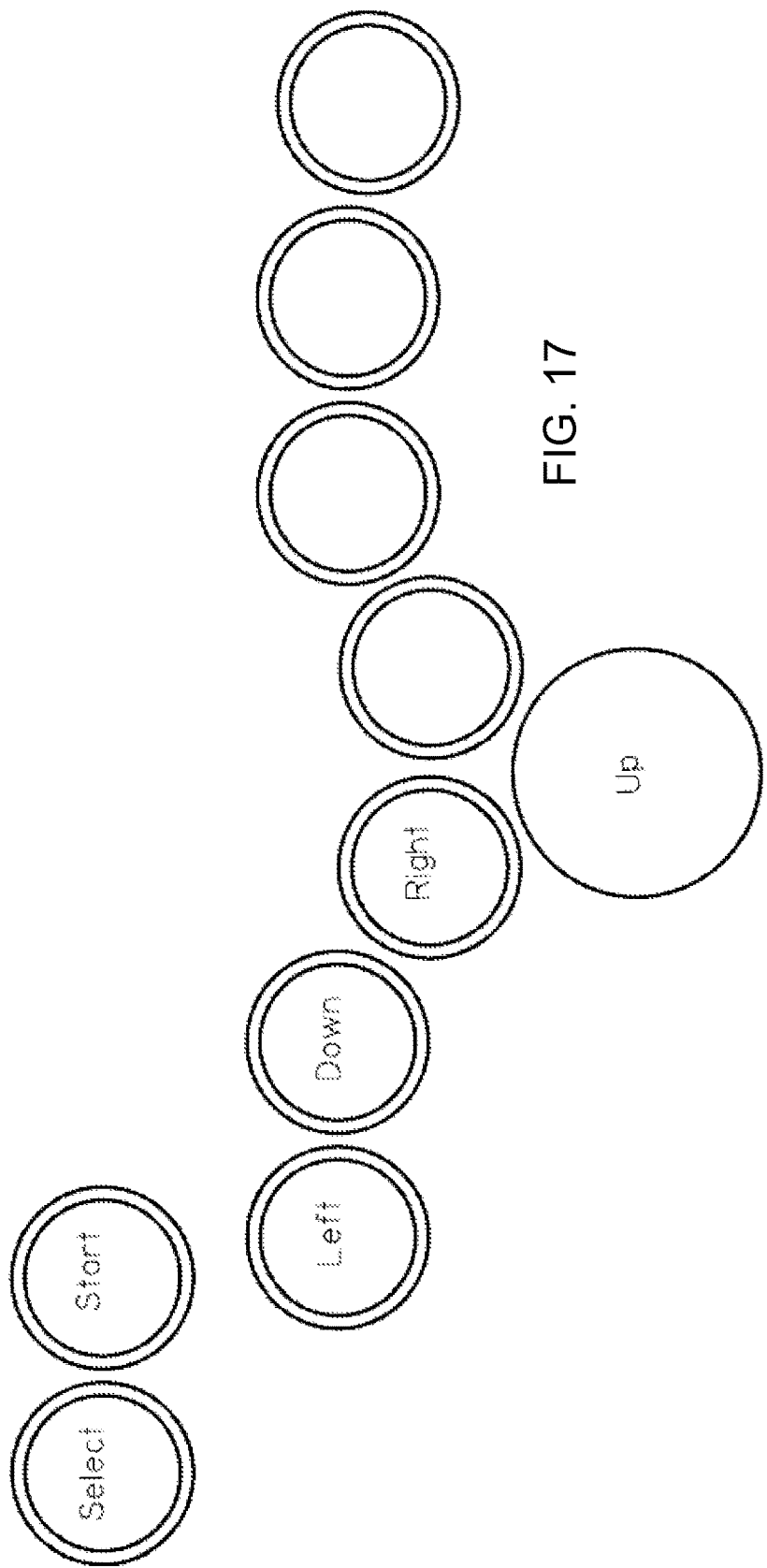
Figure 18:
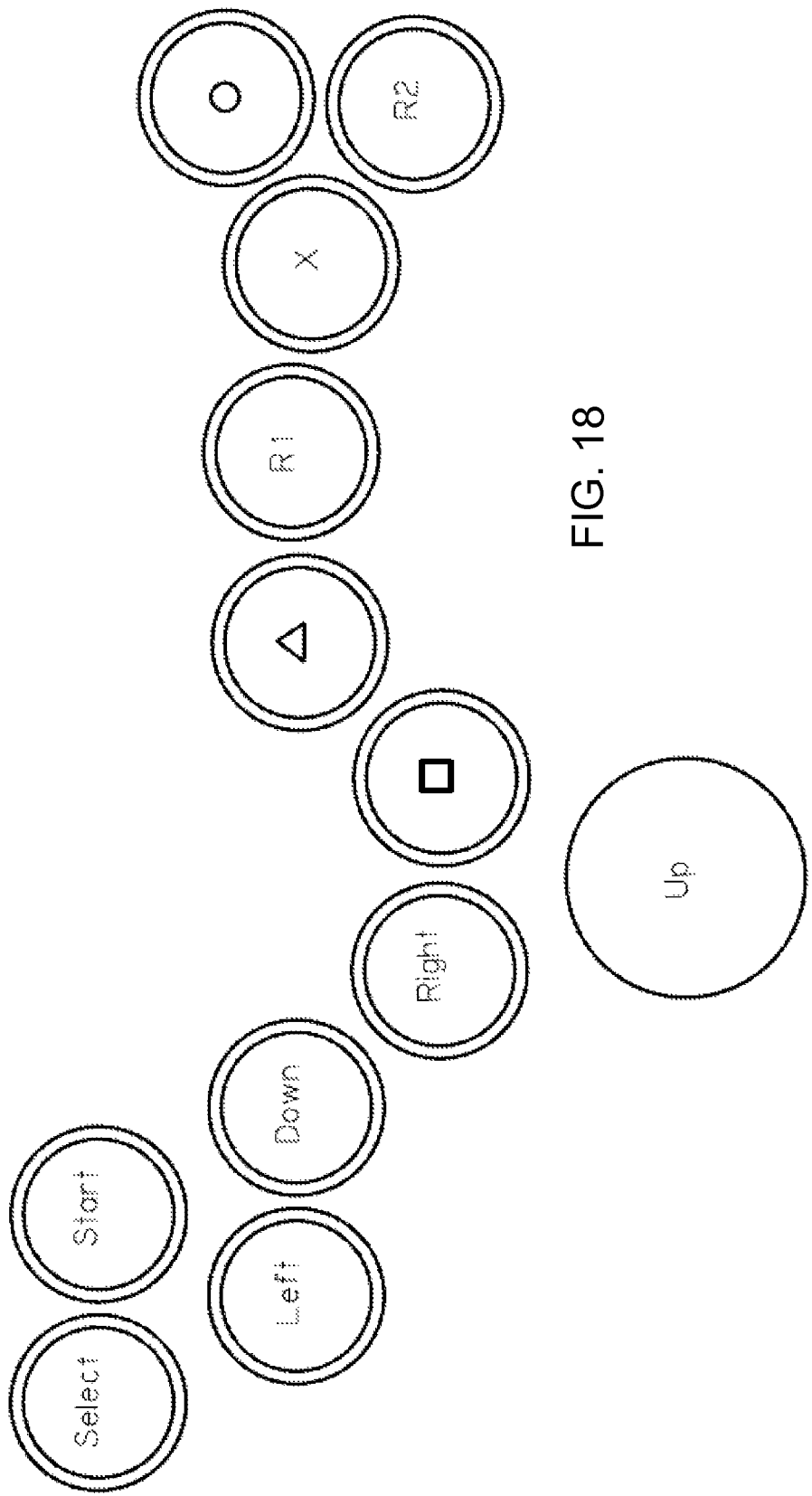

FIG. 9 shows a front view of controller 20 shown in FIG. 2. FIG. 10 shows a front see-through view of the preferred embodiment of FIG. 9. In FIGS. 10 and 11, the wiring details are displayed. FIGS. 10 and 11 show the printed circuit board (PCB) 51. In a preferred embodiment, PCB 51 is printed circuit board model no. PS360 manufactured by Akishop Corp. The PS360 PCB is an aftermarket printed circuit board which allows a user to interface with a Sony Playstation® console and an XBOX 360® console. XBOX 360® is a registered trademark of the Microsoft Corporation and refers in general to interactive game consoles. Wiring runs from the appropriate pin connections of PCB 51 to the buttons 1-15 as shown.

FIGS. 12-18 show several alternate preferred embodiments where the position of the buttons has been modified relative to each other. However, in each embodiment, the position of the buttons is arranged so that the position of the buttons matches the position of the user's fingers in a fashion similar to that shown above in reference to FIGS. 3 and 4.

FIGS. 19 and 20 show alternate embodiments where the buttons for one hand are configured to match the natural arrangement of the user's fingers. In FIG. 19 the left hand controls buttons configured similar to the up, down, left and right arrows of a keyboard. In FIG. 20 the right hand controls buttons configured similar to the up, down, left and right arrows of a keyboard. FIGS. 19 and 20 show controllers that are preferable for gamers who are used to the up, down, left and right arrows of a keyboard.

The preferred embodiments of the present invention use smaller buttons than a traditional common joystick. These buttons create a more ergonomic layout for the human hand. The preferred embodiments are modeled after the curvature of the human hand so as to greatly reduce stress over time to reduce repetitive strain injuries (RSI's). They also eliminate the need to hover the hand around searching for buttons in game, and have all buttons instantly accessible to the hands.

As shown above, there are several preferred embodiments. All are closely related in design, but have differences in button placement and button quantity.

One preferred feature shown in FIG. 2 is the directional button inputs. "Left," "Right," and "Down" are controlled by the left hand, while the final direction "Up" is controlled by the right thumb. This unique placement of "Up" allows greater ease in performing advanced techniques in fighting games. It also eliminates the common mistake of accidental "Up" inputs.

Other preferred embodiments of the present invention place the important "Up" button on the left thumb in an ergonomic curvature of the human hand.

Some of the preferred embodiments use larger standard-sized 30 mm arcade pushbuttons.

As shown above, electrical wire connects the arcade pushbuttons to the controller's circuit board. Specifically, the directional input pushbuttons are linked to the corresponding directions on the circuit board.

The present invention is an instrument designed preferably for fighting video games. Its advantages can be appreciated by the beginning player through the champion tournament player. It is designed for gamers all across the globe.

It should be noted that although the figures show a modification of a Sony Playstation® game controller, it should be understood that a PCB of any existing game controller can be substituted for PCB 51. Some of the existing game controller PCBs that can be utilized include (but are not limited to): the Xbox® controller, the Xbox 360®, Sony Playstation® 2, Sony Playstation® 3, the Nintendo Gamecube®, controller boards and kits such as the Toodles Cthulhu for Multi-Console, any existing joystick or alternative brand controller, and many more. To modify controller 101, the printed circuit board of the prior art controller of interest is inserted into controller 101 in place of PCB 51. For example to create a controller for Nintendo Gamecube® the PCB from the Nintendo Gamecube® is removed and placed in controller 101 in place of PCB 51.

There are several sub categories in models of game controllers as well. For example, Sony Playstation® game controller Playstation 1 Digital H is different in structure than Playstation 1 Dual Shock A (Late Version), but follow the same principles. Also, it should be understood that the present invention can be fabricated as a stand alone item. For example, a new controller (not tied to an existing game unit) can be built using the principles disclosed above. It is only important that both hands are able to comfortably reach and control the push buttons in a fashion similar to that described above and that the directional buttons are controlled by the fingers.

Figure 21:
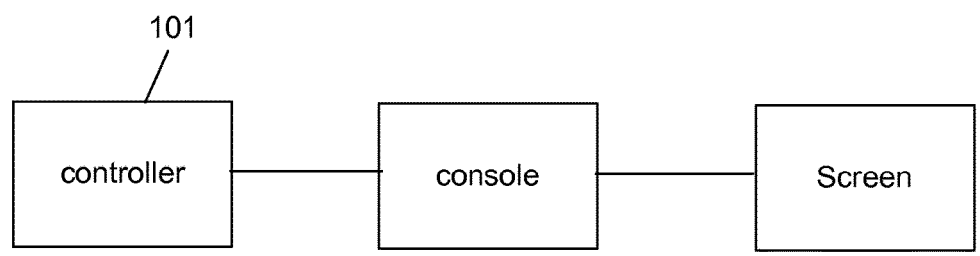
FIG. 21 shows a wire connection between a preferred controller and a console.
Figure 22:
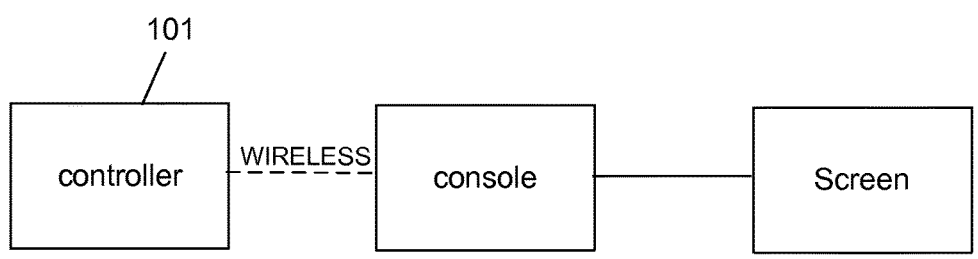
FIG. 22 shows a wireless connection between a preferred controller and a console.

It should be noted that it is possible for controller 101 to be connected to console via a wire connection (such as a USB cable shown in FIG. 21) or via a wireless connection (FIG. 22).

Although the above-preferred embodiments have been described with specificity, persons skilled in this art will recognize that many changes to the specific embodiments disclosed above could be made without departing from the spirit of the invention. For example, although FIG. 2 shows button 15 on the left side of controller 20, it can be easily moved so that it is adjacent buttons 13 and 14. It should be noted that in the preferred embodiments the buttons of ergonomic relevance are buttons 1-12, and buttons 13-15 are merely utility buttons. Therefore, the attached claims and their legal equivalents should determine the scope of the invention.

What is claimed is:

1. A hand operated game controller for controlling a game console, said game controller comprising:
   A. an all-push-button game controller surface being flat and extending horizontally between left and right edges and vertically between top and bottom edges, said left and right edges extending inwardly to a middle boundary line,
   B. said game controller surface including a left hand position extending inwardly from said left edge to said middle boundary line and a right hand position extending inwardly from said right edge to said middle boundary line, said left hand position including four movement push buttons and said right hand position including eight function buttons, each of said buttons having a generally circular shape;
   1) said four movement push buttons including a left movement button disposed closest to said left edge, a down movement button disposed between said left movement button and said middle boundary line and being the same distance to said top edge as said left movement button, a right movement button disposed between said down movement button and said middle boundary line and being closer to said bottom edge than said left and down movement buttons, and an up movement button at least partially disposed on said middle boundary line and being closer to said bottom edge than said right movement button, wherein said left, right, and down movement buttons form an arc-shape layout and said up movement button forms an elliptical-shape layout with said arc-shape layout;
   2) said eight function buttons including a top row of four function buttons and a bottom row of four function buttons wherein each of said rows of function buttons includes a first function button and a second function button spaced by a pair of middle function buttons, wherein said middle function buttons are disposed closer to said top edge than said first and second function buttons, and wherein said first row of function buttons are disposed vertically and linearly adjacent to said second row of function buttons;
   3) said up movement button is positioned below said first function buttons and said right movement button, said first function buttons and said right movement buttons being adjacent to said middle boundary line so that said up movement button can be activated with a user's left-hand thumb or the user's right-hand thumb with the left hand positioned directly over said movement buttons and the right hand positioned directly over said function buttons as described in limitations B.1) and B.2) above; and C. a connection means between said push buttons and said game console, wherein control signals are sent from said plurality of buttons to said game console via said wireless or wired connection means as said plurality of buttons is pushed by the user.

2. The hand operated controller as in claim 1 wherein said connection means is a wire connection means.

3. The hand operated controller as in claim 1, wherein said connection means is USB cable.

4. The hand operated controller as in claim 1 wherein said connection means is a wireless connection means.

5. The hand operated controller as in claim 1 further comprising a game controller printed circuit board connected between said plurality of push buttons and said wireless or wired communication means.

6. The hand operated controller as recited in claim 1 wherein said hand operated controller is box shaped.

7. The hand operated controller as recited in claim 1 wherein said buttons are circular shaped.

8. The hand operated controller as recited in claim 1 wherein said movement buttons are spaced from said left edge at least an expanse of a distance between said left movement button and said right movement button to define a flat surface for resting of a user's palm.

9. The hand operated controller as recited in claim 7 wherein said up button is the largest button.

10. A hand operated game controller for controlling a game console, said game controller comprising:

an all-push-button game controller surface extending horizontally between left and right edges and vertically between top and bottom edges, said left and right edges extending inwardly to a middle boundary line, said controller surface consisting of:

four movement push buttons including a left movement button disposed closest to said left edge, a down movement button disposed between said left movement button and said middle boundary line and being the same distance to said top edge as said left movement button, a right movement button disposed between said down button and said middle boundary line and being closer to said bottom edge than said left and down movement buttons, and an up movement button at least partially disposed on said middle boundary line and being closer to said bottom edge than said right movement button, wherein said left, right, and down movement buttons form an arc-shape layout and said up button forms and elliptical-shape layout with said arc-shape layout;

eight function buttons including a top row of four function buttons and a bottom row of four function buttons wherein each of said rows of function buttons includes a first function button and a second function button spaced by a pair of middle function buttons, wherein said middle function buttons are disposed closer to said top edge than said first and second function buttons and said first row of function buttons is disposed between said second row of function buttons from said top edge.

11. The hand operated controller as recited in claim 10 wherein each of said buttons have a circular shape and said up button being the largest and a connection means between said hand operated game controller and a game console.

12. The hand operated controller as recited in claim 10 including a PCB configured to operate with the game console.

13. The hand operated controller as recited in claim 12 wherein the game console includes at least one of an Xbox, PlayStation, or Nintendo console.

14. The hand operated controller as recited in claim 10 wherein said edges extend from said controller surface to a back surface and said top edge defines a top edge surface having at least one button associated with controlling an in game menu.

15. The hand operated controller as recited in claim 14 wherein said connection means is a cable extending from said top edge surface.

\* \* \* \* \*